United States Patent [19]

Burchett

[11] Patent Number: 4,812,673

[45] Date of Patent: Mar. 14, 1989

[54] PRINT PULSE CONTROL CIRCUIT FOR ELECTROSTATIC FLUID JET APPLICATOR

[75] Inventor: Roger C. Burchett, Miamisburg, Ohio

[73] Assignee: Burlington Industries, Inc., Greensboro, N.C.

[21] Appl. No.: 74,562

[22] Filed: Jul. 17, 1987

[51] Int. Cl.[4] .............................................. G01D 18/00

[52] U.S. Cl. ....................................... 307/106; 346/75; 307/107

[58] Field of Search ................................ 307/105-110, 307/134, 135, 150; 361/152, 153, 154, 155, 160, 191, 192; 400/120, 121, 124, 126, 154.4, 154.5, 155, 225, 320, 322; 346/76 PH, 76 R, 76 L, 75, 140 R, 140 PD, 140 IJ; 101/93.03, 93.04, 93.05, 93.09, 93.10, 93.14, 93.18, 93.21, 93.23, 93.29, 35, 37; 219/216, 543, 483, 216 PH

[56] References Cited

U.S. PATENT DOCUMENTS

| | | | |
|---|---|---|---|
| 3,596,276 | 7/1971 | Lovelady | 346/75 X |
| 3,681,778 | 8/1972 | Keur | 346/75 |
| 3,761,941 | 9/1973 | Robertson | 346/75 X |
| 3,789,422 | 1/1974 | Haskell et al. | 346/75 |
| 3,868,698 | 2/1975 | Dressler | 346/75 |
| 3,928,855 | 12/1975 | Helinski et al. | 346/75 X |
| 4,060,813 | 11/1977 | Yamada et al. | 346/75 |
| 4,087,825 | 5/1978 | Chen et al. | 346/75 |
| 4,178,597 | 12/1979 | Isayama et al. | 346/75 |
| 4,275,402 | 6/1981 | Kern | 346/75 X |
| 4,650,694 | 3/1987 | Dressler et al. | 346/75 X |

*Primary Examiner*—William M. Shoop, Jr.

*Assistant Examiner*—Paul Ip

*Attorney, Agent, or Firm*—Nixon & Vanderhye

[57] ABSTRACT

A print pulse control and driver circuit for an electrostatic fluid jet applicator is provided which promotes enhanced image quality by adjustably controlling the rising and falling edge duration of print pulses that are applied to the applicator's charge electrode array. The control circuit in pattern printing applications employs a print pulse drive bus which is shared by a large number of high voltage charge electrode drive circuits. Print pulses present on the bus are selectively used to gate high voltage to individual charge electrodes. In addition, the print pulse control circuit includes circuitry for detecting short circuits on an individual electrode basis.

40 Claims, 1 Drawing Sheet

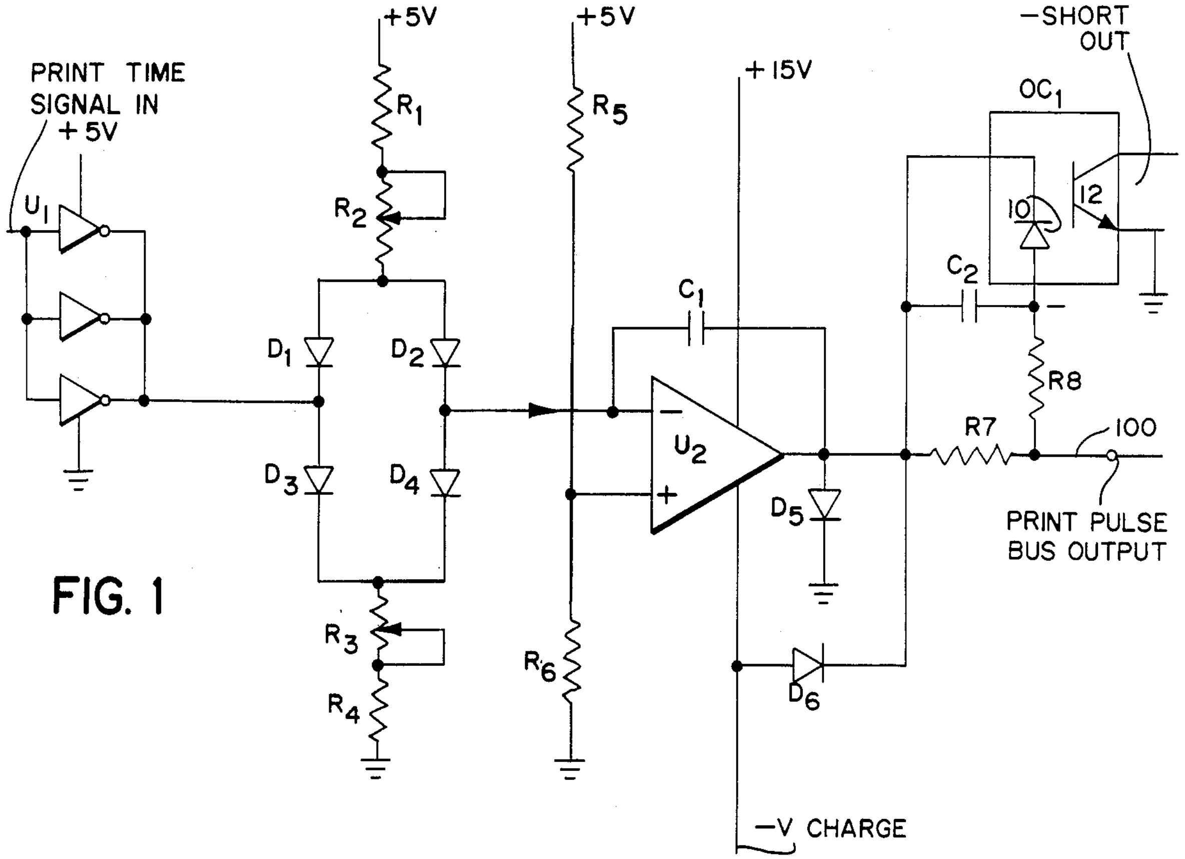
FIG. 1
FIG. 2
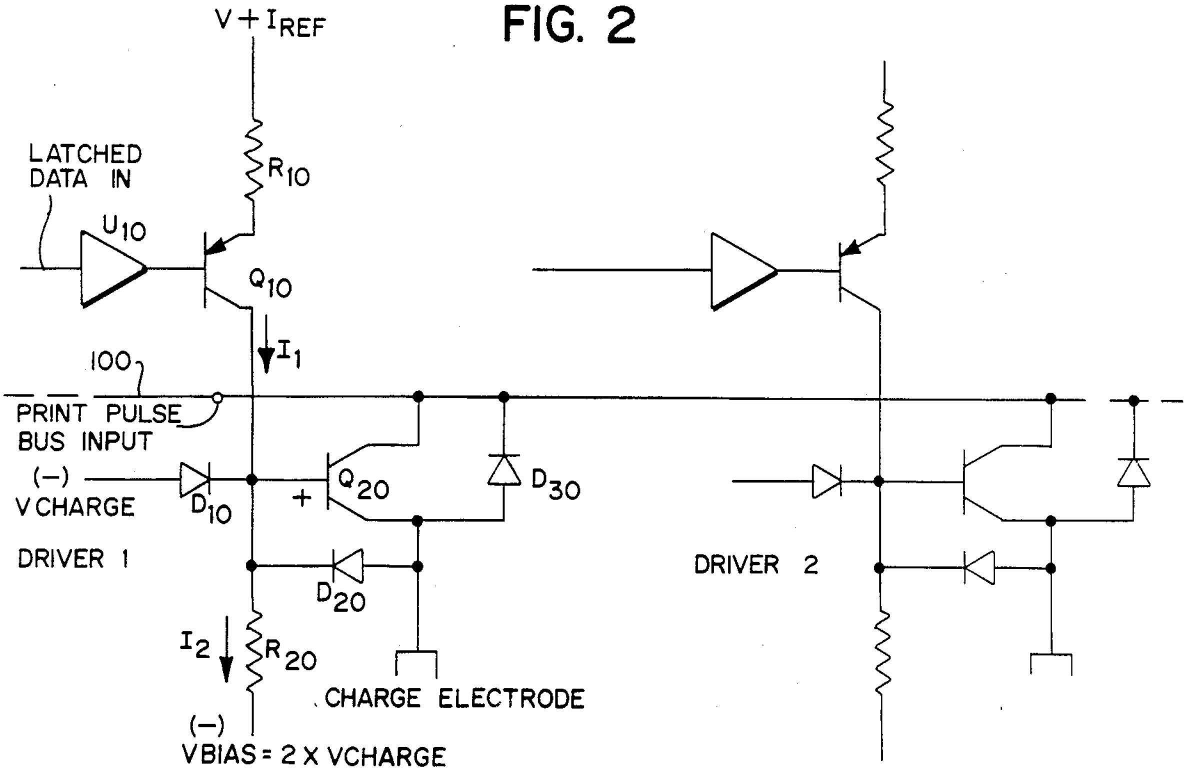

PRINT PULSE CONTROL CIRCUIT FOR ELECTROSTATIC FLUID JET APPLICATOR

FIELD OF THE INVENTION

The invention generally relates to electrostatic fluid jet applicators. More particularly, the invention relates to a print pulse control circuit which selectively applies charge voltage to individual elements of a charge electrode array in an electrostatic fluid jet applicator.

BACKGROUND AND SUMMARY OF THE INVENTION

An electrostatic fluid jet applicator is designed to apply a fluid (e.g., a liquid dye) to a moving substrate (e.g., a fabric) by: (a) selectively charging and recovering some of the fluid droplets continuously ejected from a stationary linear array of orifices affixed transverse to the movement of the substrate, while (b) allowing remaining selectively uncharged droplets to strike the substrate (e.g., thereby forming an image on the substrate).

More particularly, fluid is supplied to a linear array of liquid jet orifices in a single orifice array plate disposed to emit parallel liquid streams. These liquid jets break into corresponding parallel lines of droplets falling downwardly toward the surface of a substrate moving transverse to the linear orifice array. A droplet charging electrode array is disposed so as to create an electrostatic charging zone in the area where droplets are formed (i.e., from the jet streams passing from the orifice plate). Selective charging is achieved by individually controlling the application of charge voltage to each charge electrode which, in turn, is arranged to impart an electrostatic charge only to those droplets formed in the vicinity of that electrode. A downstream catching means generates an electrostatic deflection field which deflects all charged droplets into a catcher where they are typically collected, reprocessed and recycled to a fluid supply tank. In this arrangement, only those droplets which happen not to get charged are permitted to continue falling onto the surface of the substrate.

If an image is to be printed, it may be conventionally stored in an electronic digital memory, in the form of binary-valued picture elements (which are typically referred to as pixels). Pixel size is determined by the spacing of charge electrode elements in the transverse direction, and, longitudinally by the mechanical resolution of a rotary pulse generator (e.g., tachometer), coupled to the movement of the substrate. Typically, but not necessarily, transverse and longitudinal resolution are made equal.

With each tachometer pulse, a new line of transverse image data may be transferred from the memory to an array of individual charge voltage control (i.e., charge driver) circuits, which apply a "print" pulse of zero volts to a particular charge element when a pixel is to be printed, or full charge voltage, (typically 150 volts), when a pixel is to be left blank, as determined by the image data for that element.

The amount of fluid applied to a pixel with each print pulse is determined by the duration of the print pulse. The duration is typically set to be greater than or equal to the mean droplet formation rate, to insure that at least one droplet is available per pixel, and is set to be less than or equal to the tachometer pulse period, to insure sufficient time to deposit the required fluid.

The novel driver circuits of the present invention address a number of now recognized problems in the prior art. For example, prior art fluid jet applicators typically utilize individual high voltage driver circuits to apply charge voltage to each of the individual charge electrode elements. Each of these driver circuits determines the characteristics of the charge signal applied to its associated charge electrode, with such characteristics fixed by the driver circuit component values.

In such applicators, each driver circuit typically includes a high voltage switching device such as a transistor associated with each charge element electrode. Such switching devices are digitally controlled to apply or not apply the charge voltage to the charge electrode element to effect or not effect printing. Practical design constraints for such prior art charge driver circuits has typically led to the use of a charge voltage having positive polarity.

It is now recognized that such prior art techniques have several disadvantages. First, adjustment to charge signal characteristics require component changes at each separately controlled high voltage driver circuit, with one driver circuit required for each charge element electrode (e.g., 144 per inch along the transverse orifice array). Secondly, the prior art has typically utilized a positive charge voltage on the electrodes. In addition, the prior art typically has included no mechanism for detecting short circuits on an individual electrode basis.

Using a positive charge voltage is disadvantageous because if a short circuit occurs (e.g., due to fluid sprayed by a misaligned jet), current flows from the charging electrode to ground. Due to well known electrochemical action, metal will be preferentially removed from the more positive electrode and deposited on the more negative ground, thereby resulting in erosion of the relatively expensive charge electrode.

Advantageously, the present invention solves such prior art problems, in part, by employing a print drive bus which is shared by large numbers of relatively simple high voltage charge element electrode drive circuits. Print pulses (of controlled duration and timing and slew rate) present on the print drive bus are selectively used to gate high voltage to individual charge electrodes. In addition, the present invention includes short circuit detection circuitry to provide an indication of the approximate location of the short along the orifice array.

The driver circuit of the present invention is designed to utilize a negative polarity charge voltage to protect the delicate and costly electrode array from erosion due to the aforementioned short circuit problem. As noted above, the typical prior art driver circuit, in practical effect, requires a positive charge voltage which leads to deplating from an electrode upon the occurrence of a short circuit.

Of major significance, it is also now recognized that since the prior art applicators included no mechanism for adjustably controlling the rising and falling edges of print pulses applied to the charge electrodes, no truly satisfactory control over the phenomena known as the "J-Effect" could be achieved. In contrast, the present invention substantially prevents the "J-Effect" from degrading image quality—even under varying operating conditions (e.g., when operating with a variety of orifice plates having distinct orifice diameters).

The "J-Effect" phenomenon in fluid jet charging may be observed by viewing the array of fluid droplets descending from an orifice plate along the axis of the array while printing. At transition times, the path taken by droplets may resemble the letter "J". The "J-Effect" results in a degraded image quality and produces excessive fluid mist which may short circuit the charge and deflection electrodes.

The "J-Effect" is caused due to the interaction of the electric field of previously charged droplet(s) with droplet(s) currently being charged. For example, as a droplet breaks off, it is either not charged (if printing is to occur) or charged (if deflection and catching is to occur). When the charging voltage is turned off abruptly, the droplet now being charged is closely followed by a second droplet which may not be scheduled to be charged. However, due to the close proximity between these droplets, the charged droplet will impart a partial reverse charge on the next droplet formed.

For example, in the present invention, a negative charging electrode is used. If turned "on", the negative charging electrode will induce a positive charge on the droplet then being formed. Presuming the immediately following droplet is intended to have no charge, the positively charged droplet(s) nevertheless can be expected to impart some reverse (i.e., negative) charge on the next droplet(s) formed. Such negatively charged droplet(s) will deflect somewhat away from the catcher and may even strike the substrate causing degraded image quality and/or may produce a fluid mist and cause electrode short circuits. How pronounced the J-Effect may be will vary depending upon operating conditions. For example, different orifice plates having distinct diameter orifices may experience the J-Effect to varying degrees.

The present invention corrects for the J-Effect in a flexible and adjustable manner heretofore not possible in the fluid jet applicator art. In this regard, the J-Effect produced by different orifice plates may be readily compensated by adjusting the present circuit parameters.

Of course, the present invention also functions to dispose a charged droplet in the vicinity of a subsequent droplet which is to be left uncharged. Thus, for example, a partial reverse charging would be expected on the next subsequently formed droplet. However, in addition, the charge electrode in the present invention is left with a partial voltage still on it during this transition period. The combined or net effect of such events results in a nearly zero charge on the subsequent droplet (rather than the normally expected partial reverse charge). The present invention obtains this effect in a manner which allows for ready adaptation to different operating conditions by adjustably controlling the turn-off transition of charge voltage so that it occurs over a period of one or two times the mean droplet formation period for a given operating condition.

The architecture of the present invention advantageously allows the rate of change of charge voltage to be readily adjusted simultaneously for a large number of charge electrodes. Thus, the present invention permits a wide variation in the type of printing that can be accomplished with a jet applicator system by permitting the rate of change of charge voltage to be adjusted to compensate for variations in the stimulation frequency, different orifice diameters, etc., without the need to redesign/reconstruct all the individual charge driver circuits.

The present invention also rapidly turns "on" the charge voltage to minimize the possibility that a particular droplet may be formed during the transition period and thus result in partial charging of the droplet. A partially charged droplet will not be fully deflected and therefore will result in poor catching. Turn-on time is preferably controllably reduced to just short of the point that: (a) cross-talk to adjacent electrodes become a problem or (b) electromagnetic interference (EMI) becomes excessive. The present invention advantageously allows for independent adjustment of charge voltage turn-on and turn-off rates.

BRIEF DESCRIPTION OF THE DRAWINGS

These as well as other objects and advantages of this invention will be better appreciated by reading the following detailed description of a presently preferred exemplary embodiment taken in conjunction with the accompanying drawings of which:

FIG. 1 is a schematic diagram of presently preferred embodiment of a print pulse bus drive circuit; and FIG. 2 is a schematic diagram of a digitally driven individual charge electrode element driver circuit which may be utilized in conjunction with the circuit of FIG. 1.

DETAILED DESCRIPTION

Turning to FIG. 1, the print pulse driver receives a print time signal input from the fluid jet applicator's print time controller, which may be, for example, of the type shown in U.S. Pat. No. 4,650,694. Such a print time controller may, for example, receive a tachometer signal which reflects the speed of travel of the substrate. Each time a tachometer pulse occurs (e.g., 144 pulses per inch), the print pulse controller may generate a several hundred microsecond pulse which defines the time "window" during which the charge electrodes may be selectively turned "off" to thereby allow printing to occur. The amount of fluid which will be applied to the substrate may be varied by the duration of such a print pulse.

As shown in FIG. 1, a TTL level print time signal (i.e., a pulse) is received by a conventional CMOS buffer circuit U1. By way of example, the buffer is shown as three parallel buffer devices which isolate the received signal, and square the signal in a manner known to those skilled in the art while reducing noise and insuring predictable voltage and impedance levels. The print pulse input is supplied in parallel to a large number of IC cards, each having the driver circuit of FIG. 1.

Diode ring D1–D4 forms a diode switch arrangement which is driven by the output of U1. The function of the diode ring and associated resistances R1–R4 is to allow for accurate control over charging and discharging rates for C1 included with op-amp U2 as a Miller integrator. In this regard, R2 and R3 may be adjusted independently to control the print pulse rise or fall rates.

It will be understood by those skilled in the art that there are other ways to control the print pulse rise and fall times. For example, one may remotely program the rise and fall times with a digital control signal. In such an embodiment, R1 and R2, for example, may be replaced by a programmable current source, which decodes a received digital word defining the fall time and which includes a digital to analog converter that generates a corresponding analog current.

In either implementation, this portion of the circuit functions as a switchable current source/sink which is driven by the output of U1 and whose output is connected to the inverting input of operational amplifier (Miller integrator) U2. U2's input is referenced to ½ the logic supply voltage (e.g., +5 v) by R5 and R6 connected to its non-inverting input.

U2 is a high voltage operational amplifier (e.g., connected to $-V_{charge}$ such as $-150$ volts) which has built in current limiting set to a value high enough to insure adequate slewing of charge voltage with all charge elements simultaneously active (e.g., 144) under a normal range of electrode loading conditions. At the same time, the built in current limiting of U2 is set low enough to prevent damage to individual charge driver circuits (FIG. 2) or individual charge electrodes under short circuit conditions.

When the output of U1 goes positive, a current source through R1 determines how fast the output of op amp U2 goes negative. The higher the current source supplied via R1, the more rapidly U2 goes negative.

More particularly, with respect to the operation of D1–D4, as the output of U1 goes high, diode D3 conducts and diode D1 is reversed biased. Diode D4 is also reversed biased by the voltage at the cathode of forward-biased D3, allowing current to flow through R1, R2 and D2 into U2/C1. Accordingly, R2 controls the turn-on rate of the charge voltage. Thus, by adjusting R2 so that turn-on is rapid, the possibility that a particular droplet will be formed during the charge voltage transition period can be minimized. As noted previously, turn-on time should be reduced to just short of the point that cross-talk to adjacent electrodes becomes a problem, or radiated EMI is excessive.

On the other hand, whenever the output of U1 goes low, the output of U2 will slew high, because D4 now will become forwarded biased (D2 becomes reverse biased) and R3 and R4 will control the turn-off rate of the charge voltage (i.e., the discharge rate of C1). Thus, the lower the resistance of R3 and R4, the faster the output of U2 will switch high.

Accordingly, by adjusting R3, the positive going edge of the print pulse may be rate-adjusted, whereas by adjusting R2, the negative going edge of the print pulse may be rate-adjusted. By adjusting R3 so that turn-off occurs over a period of one or two times the expected mean droplet formation period, the "J-Effect" can be compensated for in the manner discussed above. The diode ring D1–D4, besides functioning as a switchable current source/sink, serves to provide reverse isolation for U1 and the system control circuitry connected thereto in the event of a short circuit on the charge electrodes.

Focusing on the output of U2, the print pulse bus must be prevented from going positive. However, as shown in FIG. 1, for proper operation U2 is also connected to a slightly positive supply voltage of +15 V. Clamping diode D5, which is connected to the output of U2, substantially prevents the print pulse bus 100 from going positive.

Clamping diode D6 is another protective device which keeps the output of U2 from going more negative than the negative supply voltage $-V_{charge}$ (e.g., in the event that arcing during short circuit conditions results in inductive fly-back due to wiring inductance).

At the output of U2 is a current sensing device formed by optical coupler OC1, R7, R8 and C2 which serves as a shorted electrode detector As excessive current is drawn from the print pulse bus 100, a voltage is developed across current limiting resistor R7. When this voltage exceeds the threshold of LED 10 in OC1, output transistor 12 switches "on" (in response to light output from LED 10) to indicate an alarm condition which indicates the presence of a short circuit to ground condition somewhere within the particular charge electrodes serviced by the circuit of FIG. 1. This may, for example, be a specific one inch segment of 144 electrodes within a 1.8 meter overall electrode array.

C2 prevents false short circuit indications due to momentary current spikes during print pulse transitions while also integrating and thus stretching the pulse appearing across R7 to aid in detecting a short circuit.

In the present system, only short circuits to ground are likely to occur. A short circuit to the negative supply voltage is not likely. In a system where a short to the negative supply is likely to occur, an additional optical coupler and short circuit detector (e.g., having a reversed polarity diode 10) may be added to the circuit of FIG. 1 which would be actuated under a short circuit to negative supply voltage condition.

Turning next to FIG. 2, U10 may be a portion of a conventional IC 74HC595, which is a combination serial shift register and latch having a CMOS output. A stream of data to be printed is loaded into the shift register. After the data is shifted into the shift register, a control line is toggled which results in the transfer of data into the IC latches. Such latched data then drives U10 in FIG. 2. Each driver 1, 2, etc. in FIG. 2 includes a digitally controlled gate consisting of Q10, Q20, D10, D20, D30 and R10 and R20.

Whenever the data input signal is high at the output of U10, transistor Q10 is turned off, Il is zero and the base of Q20 is held at $-V_{charge}$ by D10 forward biased by current $I_2$, and the emitter of Q20 is held at $-V_{charge}$ through D20. Under these conditions, any transitions on the print pulse bus 100 at the collector of Q20 are ignored since Q20 is biased "off."

Whenever the data at the output of U10 goes low, transistor Q10 conducts. The current Il through Q10 is greater than $I_2$, with the excess current ($I_1$-$I_2$) for biasing transistor Q20. As the print pulse bus at the collector of Q20 switches positive (to ground) to print, the emitter of Q20 (and the charge electrode) will follow. As the print pulse bus switches negative (−V charge) to catch, diode D30 conducts, returning the charge electrode to −V charge.

Diode D10 is a high capacitance device with a long storage time compared to the slew rates experienced in the circuit of FIG. 1. These characteristics reduce cross-talk due to inter-electrode coupling by shunting induced current to $-V_{charge}$ when the driver is disabled and the diode D10 is forward biased. When Q10 is off (no printing is to occur), D10 will be forward biased by current $I_2$. Cross-talk will be reduced since induced charges on the charge electrode will couple through D20 to the cathode of D10, and thus to the low impedence −V charge source.

When the driver is enabled and Q10 is conducting (and the circuit is ready to print), diode D10 will be reversed biased (i.e., the voltage at the cathode of D10 will be positive with respect to $-V_{charge}$). When the driver is ready to print, diode D10 is reversed biased due to the $V_{be}$ drop of Q20 and the forward voltage of diode D30 to the print pulse bus. This reverse bias reduces the D10 voltage variable capacitance (and eliminates the D10 storage delay) thereby allowing Q20 to follow the signal on the print pulse bus 100 as it goes positive (to ground).

As the print pulse bus 100 goes negative, diode D30 will conduct, pulling the charge electrode to the $-V_{charge}$ supply. Whether Q10 is turned on or turned off, diode D30 will always conduct and pull the charge electrode to ground (if the charge electrode is not already at ground).

Transistor Q20 has high voltage and high current carrying capability to insure survival of the charge driver circuit under any short circuit conditions. In the event of a short circuit from the charge electrode to ground, every time the print pulse drive pulse switches to print, diode D30 will conduct and will cause the current limit detector on the output of U2 in FIG. 1 to sense that there is a short circuit.

The short circuit detector of the present invention will detect a short whether the charge electrode is selected to print or not. If the charge electrode element has fluid on it and a short to ground results, the charge electrode will try to pull up towards ground. If the applicator is in the catch mode (Q10 is turned off) and no printing is desired, and if a short is present, every time the print pulse bus 100 goes positive, the electrode will try to go positive as well. However, because of the short, whenever the print pulse bus 100 goes negative, diode D30 will conduct and will pull the charge electrode to $-V_{charge}$ When this occurs, because of the short circuit, excessive current will be drawn and the short detector in FIG. 1 will sense this condition.

If Q10 is turned on and a short is present, the same result will occur. When the print pulse drive bus 100 goes positive (to ground), the electrode will follow. However, when there is a short to ground, excessive current will be drawn through D30 which will be detected by the short detector of FIG. 1.

The charge driver circuit of the present invention as shown in FIG. 2 uses a master print pulse bus 100 and selectively gates the pulse to each electrode. For a gate to be properly enabled to apply the print pulse from the print pulse bus 100 to its particular charge electrode, the gate must be properly biased. In this regard, R20 and $-V_{bias}$ are chosen so that I2 is always less than Il when Q10 is conducting.

$-V_{bias}$ is derived from the same variable power supply as $-V_{charge}$ and may, for example, be equal to twice $-V_{charge}$. $V+I_{ref}$ is a variable voltage reference of approximately the same potential as the logic power supply used by U10 and is proportional to $-V_{charge}$. For a higher charge voltage, a higher current through R20 results and a higher $I_{ref}$ will be generated to compensate for the extra current that goes into $-V_{bias}$.

As will be appreciated by those skilled in the art, a feedback circuit is used to vary $V+I_{ref}$ to allow I1 to track changes in $-V_{charge}$ thereby maintaining optimum switch performance through a wide range of charge voltage settings. In this regard, $I_{ref}$ is conventionally modulated by a sample of the charge voltage so that, as the charge voltage is varied, the voltage reference $I_{ref}$ is automatically proportionally varied. The ability to vary $-V_{charge}$ and $I_{ref}$ allows the driver circuit of the present invention to be used in conjunction with orifice arrays having different orifice sizes. In this regard, it is noted that larger droplets typically require a larger charge voltage. As noted above, having variations in $I_{ref}$ automatically correspond to variations in $-V_{charge}$ permits maintaining optimum switch performance through a range of charge voltages.

The print pulse driver circuit shown in FIG. 1, if desired, also may be used in solid shade applications, by connecting the print pulse bus 100 directly to the single electrode that controls charging of droplets from an entire cross-machine orifice array. The circuit of FIG. 2 is used in combination with FIG. 1 for pattern printing.

While the present invention has been described in terms of one presently preferred embodiment, it is not intended that the invention be limited by such description. It will be apparent to those skilled in the art that many modifications may be made while retaining novel advantage(s) of this invention as defined in the claims which follow.

What is claimed is:

1. In an electrostatic fluid jet applicator having control means for generating print timing signals, and means for selectively charging fluid droplets for controlling fluid deposition onto a moving substrate including at least one charging electrode, a drive circuit for generating high voltage print pulses for application to at least one charging electrode, said drive circuit comprising:

adjustable means, responsive to said print timing signals, for adjustably generating print pulses having a predetermined but adjustable rate of transition for controlling the rate of transition between the state of applying high voltage to said at least one charging electrode and the state of not applying high voltage to said at least one charging electrode; and means for distributing said generated print pulses to said at least one charging electrode.

2. A driver circuit according to claim 1, wherein said adjustable means includes means for independently adjusting the print pulse rising edge and falling edge durations.

3. A driver circuit according to claim 1, further including: a plurality of charging electrodes, and means for detecting short circuits in any one of said charging electrodes.

4. A driver circuit according to claim 1, further including a plurality of charging electrodes, and wherein said means for distributing includes:

a common print pulse drive bus for transmitting said generated print pulses to said plurality of charging electrodes; and a plurality of gating means, each respectively associated with at least one of said plurality of charging electrodes, said plurality of gating means being connected for receiving said print pulses via said common print pulse drive bus and for selectively gating said print pulses to an associated charging electrode.

5. A driver circuit according to claim 1, further including means for supplying a negative polarity charge voltage to said at least one charging electrode, whereby the charging electrode is protected from erosion under short circuit conditions.

6. A driver means according to claim 1, further including means for receiving said print timing signals, and wherein said adjustable means includes switch means controllably driven by the output of said means for receiving for controlling print pulse rise and fall time to compensate for any undesireable interaction of the electric field of previously charged droplets with the droplets currently being charged, and to minimize the possibility that a droplet will be formed during the charge voltage transition period.

7. A driver circuit according to claim 1, wherein said adjustable means includes:
means for receiving said print timing signals;
integrator means; and
switching current control means responsive to said received print timing signals, for providing an adjustable source or sink of current for said integrator means, said switchable current control means having an output coupled to an input of said integrator means for controllably determining the charging and discharging current for said integrator means.

8. A driver circuit according to claim 7, wherein said switchable current control means includes a first pair of diodes and first variable resistance means, responsive to a first logic level of said print timing signal for controllably varying the falling print pulse edge duration and a second pair of diodes and second variable resistance means, responsive to a second logic level of said print timing signal for controllably varying the rising print pulse edge duration.

9. A driver circuit according to claim 1, including a print pulse driver output bus connected to the output of said adjustable means, and clamping means for preventing said print pulse driver bus from going positive due to a positive output from said adjustable means.

10. A driver circuit according to claim 1, further including shorted electrode detector means coupled to the output of said adjustable means for sensing short circuits in said at least one charging electrode.

11. A driver circuit according to claim 10, wherein said shorted electrode detector means includes means for sensing when excessive current is drawn at said at least one charging electrode and means responsive to the sensed excessive current for indicating the presence of a short circuit condition.

12. A driver circuit according to claim 11, wherein said means for sensing excessive current includes a current limiting resistor connected to the output of said means for adjustably generating print pulses, and optical coupler means responsive to a predetermined voltage across the current limiting resistor for indicating the presence of a short circuit.

13. In a fluid jet applicator having control means for generating print timing signals, an orifice array, means for passing fluid through said array to form a plurality of fluid droplets, means for selectively charging said fluid droplets, for controlling the fluid deposition onto a moving substrate including a plurality of charge electrode elements, a charge electrode control circuit comprising:
at least one driver means, responsive to said print timing signals, for generating high voltage print pulses;
an output common bus for distributing said print pulses to a plurality of charge electrode elements; and
a plurality of gating means, each respectively associated with at least one charge electrode element and coupled to said common bus, each gating means for selectively gating said print pulses to an associated one of said plurality of charge electrode elements.

14. A charge electrode control circuit according to claim 13, wherein said driver means includes means for detecting a short circuit in any one of said plurality of charge element electrodes.

15. A charge electrode control circuit according to claim 13, further including:
a plurality of latching means for storing printing data, each respectively associated with at least one of said gating means,
each of said gating means including means responsive to the data stored in an associated latching means and to said print pulses for selectively gating the print pulses to an associated charge electrode element depending upon the state of said stored data.

16. A charge electrode control circuit according to claim 15, wherein said gating means includes:
means responsive to said stored data for selectively supplying current, and
switching means responsive to said current for passing one of said print pulses to said charge element electrode when said one of said print pulses is at a predetermined state.

17. A charge electrode control means according to claim 16, wherein said switching means further includes:
transistor means for supplying charging voltage to said charge electrode element, said transistor means having a collector coupled to said output common bus and an emitter coupled to said charge electrode element,
biasing means for forward biasing said transistor means in response to said current such that print pulses from the common bus are selectively passed to said charge electrode element.

18. A charge electrode control circuit according to claim 15, said gating means further including means for reducing cross-talk due to inter-electrode coupling.

19. A charge electrode control circuit according to claim 13, further including means for supplying a negative polarity charge voltage to said plurality of charge electrode elements, whereby the charge electrode elements are protected from erosion under short circuit conditions.

20. A charge electrode control circuit according to claim 13, wherein said driver means includes means for detecting a short circuit in any one of said plurality of charge electrode elements; and short circuit indicating means for indicating the presence of a detected short circuit.

21. A charge electrode control circuit according to claim 13, wherein said driver means includes means for adjustably generating print pulses, said means for adjustably generating including means for independently adjusting the rising edge and falling edge duration of said print pulses.

22. A charge electrode control circuit according to claim 21, said driver means further including means for receiving said print time signals; and wherein said means for independently and adjustably generating the rising edge and falling edge duration of said print pulses includes switch means controllably driven by the output of said means for receiving, for controlling print pulse rise and fall time to compensate for any undesireable interaction of the electric field of previously charged droplets with the droplets currently being charged, and to minimize the possibility that a droplet will be formed during the charge voltage transition period.

23. A charge electrode control circuit according to claim 13, wherein said driver means includes means for supplying a charge voltage of a negative polarity to said plurality of charge electrode elements, whereby the charge electrode elements are protected from erosion under short circuit conditions.

24. A charge electrode control circuit according to claim 14, wherein said adjustable means includes:
means for receiving said print timing signals;
integrator means; and
switching current control means responsive to said received print timing signals, for providing an adjustable source or sink of current for said integrator means, said switchable current control means having an output coupled to an input of said integrator means for controllably determining the charging and discharging current for said integrator means.

25. A charge electrode control circuit according to claim 24, wherein said switchable current control means includes a first pair of diodes and first variable resistance means, responsive to a first logic level of said print timing signal for controllably varying the falling print pulse edge duration and a second pair of diodes and second variable resistance means, responsive to a second logic level of said print timing signal for controllably varying the rising print pulse edge duration.

26. In an electrostatic fluid jet applicator having orifice array means for forming a plurality of fluid droplets, control means for generating print time signals and means responsive to high voltage print pulses for selectively charging fluid droplets including at least one charging electrode, a method for generating high voltage print pulses for application to said at least one charging electrode comprising the steps of:
adjustably generating print pulses having a predetermined but adjustable rate of transition to compensate for any undesirable interaction of the electric field of previously charged droplets with the droplets currently being charged, and
distributing the generated print pulses to at least one charge electrode element.

27. A method according to claim 26, further including the steps of:
changing the fluid jet applicator operating conditions to modify the nature or frequency of the droplets formed, and
adjusting at least one present circuit parameter to compensate for said undsirable interaction in view of the modified operating conditions.

28. A method according to claim 26, wherein the applicator further includes a plurality of charge electrode elements, and said step of distributing further includes:
transmitting said generated print pulses along a common output bus, and
selectively gating the print pulses to each of said plurality of charge electrode elements depending upon the state of printing data for each of said charge electrode elements.

29. A method according to claim 26, wherein the step of adjustably generating further includes the step of:
independently adjusting the rising edge and the falling edge duration of the print pulses.

30. A method according to claim 26, further including the step of detecting short circuits associated with at least one of said charge electrode elements.

31. A method according to claim 30, further including the step of indicating, in the event of a detected short circuit, the approximate location at which the short circuit occurred along the orifice array.

32. A method according to claim 26, further including supplying a negative polarity charge voltage to said at least one charge electrode element, whereby the charge electrode element is protected from erosion under short circuit conditions.

33. A method according to claim 26, further including receiving said print timing signals; and wherein said step of adjustably generating includes the step of controllably driving a switch means by the received print timing signals to control print pulse rise and fall time to compensate for the J-Effect and to minimize the possibility that a droplet will be formed during the charge voltage transition period.

34. In an electrostatic fluid jet applicator having control means for generating print time signals, and means for selectively charging fluid droplets including at least one charging electrode, a driver circuit for generating high voltage print pulses for application to said at least one charging electrode, said driver circuit comprising:
means, responsive to said print time signals, for generating print pulses having a predetermined but adjustable rate of transition to compensate for any undesirable interaction of the electric field of previously charged droplets with the droplets currently being charged, said means for generating including adjustable means for compensating for said undesirable interaction under a plurality of different operating conditions, and
means for applying said print puses to at least one charging electrode.

35. A driver circuit according to claim 34, wherein said means for compensating includes means for independently adjusting the rising edge and said falling edge duration of said print pulses.

36. A driver circuit according to claim 34, further including:
a plurality of charging electrodes; and
means for detecting short circuits in any one of said charging electrodes.

37. A driver circuit according to claim 34 further including:
a plurality of charge electrode elements, and wherein said means for applying includes:
a common print pulse drive bus for transmitting said generated print pulses to said plurality of charge electrode elements; and
a plurality of gating means, each respectively associated with at least one of said charge electrode elements, said plurality of gating means being connected for receiving said print pulses via said common print pulse drive bus and for selectively gating said print pulses to an associated charge electrode element.

38. A driver circuit according to claim 34, further including means for receiving said print timing signals, and wherein said means for generating includes:
switch means, controllably driven by the output of sia means for receiving, for controlling print pulse rise and fall time to compensate for said undersirable interaction and to minimize the possibility that droplet will be formed during the charge voltage transition period.

39. A driver circuit according to claim 34, wherein said driver further includes means for supplying a charge voltage of a negative polarity to said at least one charge element electrode, whereby the charge element electrode is protected from erosion under short circuit conditions.

40. A driver circuit according to claim 37, further including:

a plurality latching means for storing printing data for said plurality of charge electrode elements, each of said latching means respectively associated with at least one of said gating means, each of said gating means including means responsive to the data stored in an associated latching means and to the print pulses for selectively gating print pulses to said charge electrode element depending upon the state of said stored data.

* * * * *